United States Patent
Lenhart et al.

[11] Patent Number: 5,180,282
[45] Date of Patent: Jan. 19, 1993

[54] GAS TURBINE ENGINE STRUCTURAL FRAME WITH MULTI-YOKE ATTACHMENT OF STRUTS TO OUTER CASING

[75] Inventors: Kenneth J. Lenhart, Cincinnati; Michael L. Barron, Loveland, both of Ohio; Thomas G. Wakeman, Lawrenceburg, Ind.; Donald L. Bellia, West Chester, Ohio

[73] Assignee: General Electric Company, Cincinnati, Ohio

[21] Appl. No.: 766,249

[22] Filed: Sep. 27, 1991

[51] Int. Cl.$^5$ .............................. F04D 29/34
[52] U.S. Cl. ................ 415/209.2; 415/209.3; 403/287; 403/299
[58] Field of Search .............. 415/208.1, 209.2, 209.3, 415/209.4, 210.1, 189, 190; 403/287, 299, 379

[56] References Cited

U.S. PATENT DOCUMENTS

| | | | |
|---|---|---|---|
| 764,433 | 7/1904 | Dodge | 415/209.2 |
| 925,065 | 6/1909 | Wilstam | 415/190 |
| 1,124,029 | 1/1915 | Jude | 415/209.4 |
| 2,571,244 | 10/1951 | Hollander | 403/379 |
| 2,807,433 | 9/1957 | Halford et al. | 415/209.4 |
| 2,809,491 | 10/1957 | Wosika | 415/210.2 |
| 2,869,941 | 1/1959 | Shoup, Jr. et al. | 415/142 |
| 3,250,512 | 5/1966 | Petrie | 415/135 |
| 3,620,641 | 11/1971 | Keen et al. | 415/170 |
| 3,778,185 | 12/1973 | Plowman et al. | 415/209.4 |
| 3,836,282 | 9/1974 | Mandelbaum et al. | 415/209.4 |
| 4,015,910 | 4/1977 | Harmon et al. | 415/209.2 |
| 4,249,859 | 2/1981 | Benyi, Jr. et al. | 415/209.4 |
| 4,428,713 | 1/1984 | Coplin et al. | 415/48 |
| 4,478,551 | 10/1984 | Honeycutt | 415/142 |
| 4,594,761 | 6/1986 | Murphy et al. | 415/208.1 |
| 4,655,682 | 4/1987 | Kunz et al. | 415/209.4 |
| 4,722,184 | 2/1988 | Chaplin et al. | 415/209.1 |

FOREIGN PATENT DOCUMENTS 67806  6/1977  Japan .................. 415/189

*Primary Examiner*—John T. Kwon
*Attorney, Agent, or Firm*—Jerome C. Squillaro

[57] ABSTRACT

A structural frame component for use in a gas turbine engine includes an annular outer shell, an annular inner central hub, a plurality of circumferentially-spaced struts extending between the outer shell and central hub, each strut being attached at its inner end to the central hub, and a multi-yoke attachment between the outer ends of the struts and the outer shell. The multi-yoke attachment is composed of a plurality of yokes. Each yoke includes a clevis and a plurality of radially oriented fasteners and tangentially oriented fasteners respectively attaching the clevis between the outer shell and the outer end of a respective one strut.

10 Claims, 2 Drawing Sheets

GAS TURBINE ENGINE STRUCTURAL FRAME WITH MULTI-YOKE ATTACHMENT OF STRUTS TO OUTER CASING

CROSS-REFERENCE TO RELATED APPLICATIONS

Reference is hereby made to the following copending U.S. patent applications dealing with related subject matter and assigned to the assignee of the present invention:

1. "Gas Turbine Engine Structural Frame With Multi-Clevis Ring Attachment of Struts To Outer Casing" by Laura A. Fowler et al, assigned U.S. Ser. No. 76,255 and filed Sep. 27, 1991. (13DV-10416)

2. "Gas Turbine Engine Structural Frame With Outer Casing Flange Pockets Gripping Strut Outer Ends" by James W. Brantley, assigned U.S. Ser. No. 766,298 and filed Sep. 27, 1991. (13DV-10160)

BACKGROUND OF THE INVENTION

1. Field of the Invention

The present invention relates generally to gas turbine engines and, more particularly, to a structural frame component in a turbine engine using a plurality of yokes for attaching the outer ends of radial struts to the outer casing of the frame component.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a forward fan. The forward fan provides the main propulsive thrust generated by the engine.

The static parts of a gas turbine engine, namely, frames, casings and mounts, are components that do not rotate but instead provide the overall backbone of the engine. These static components must maintain alignment between the rotors and stators of the engine. In many instances, this requirement dictates a need for stiffness, rather than strength, in the construction of the frames.

A structural frame component in a turbine engine is a static part that supports bearings which, in turn, support the rotatable rotors of the engine. The typical elements of a structural frame component, such as one located between the high and low pressure turbines of the engine, are an outer casing, an inner hub, and a plurality of circumferentially-spaced generally radial struts extending between the shells. The outer casing and inner hub are also commonly referred to as outer and inner rings or shells.

To protect frame struts from gases at high temperatures, for example 1900° F., flowing in the flowpath from the high pressure turbine to the low pressure turbine, an air-cooled, aerodynamically-shaped fairing or nozzle encases each of the frame struts. The nozzles are assembled about the frame struts by placing them over the outer ends of the struts. This must be carried out before the struts are attached to the outer casing. Thus, a mechanical connection of some type must be provided between the outer ends of the struts and the outer shell which can be readily assembled after the nozzles have first been installed over the struts.

However, in order to minimize engine performance losses, the nozzles installed over the struts and the struts themselves must be as thin as possible. Unfortunately, there is not sufficient material at the strut ends to enable radial bolting to the outer casing. Consequently, a need exists for a mechanical connection between the outer ends of the struts and the outer casing having a design which will achieve these requirements.

SUMMARY OF THE INVENTION

The present invention provides a multi-yoke attachment designed to satisfy the aforementioned needs. The multi-yoke attachment of the present invention has an overall size which permits the nozzles to fit over the parts of the connection on the struts, and has a simplicity of construction that reduces weight and increase reliability of the parts of the connection. The yoke attachment provides a transition piece that has sufficient structure to enable radial fastening of the respective thin strut to the outer casing.

Accordingly, the present invention is directed to a structural frame component for use in a gas turbine engine which comprises: (a) an annular outer shell; (b) an annular inner central hub; (c) a plurality of circumferentially-spaced struts extending between the outer shell and central hub, each strut being attached at its inner end to the Central hub; and (d) a multiyoke attachment including a plurality of yokes each in the form of a clevis attached between the outer shell and an outer end of a respective strut.

More particularly, each clevis includes an inner bifurcated portion defining a slot which receives the outer end of the respective strut and an outer base portion attached to the inner bifurcated portion. Aligned holes are formed through the inner bifurcated portion and fasteners are provided for fitting through the aligned holes to releasably fasten the clevis at its inner bifurcated portion to the outer end of the strut. The clevis also has at least one threaded bore formed therein and being open at an outer end of the outer base portion and extending radially inwardly toward the inner bifurcated portion of the clevis.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
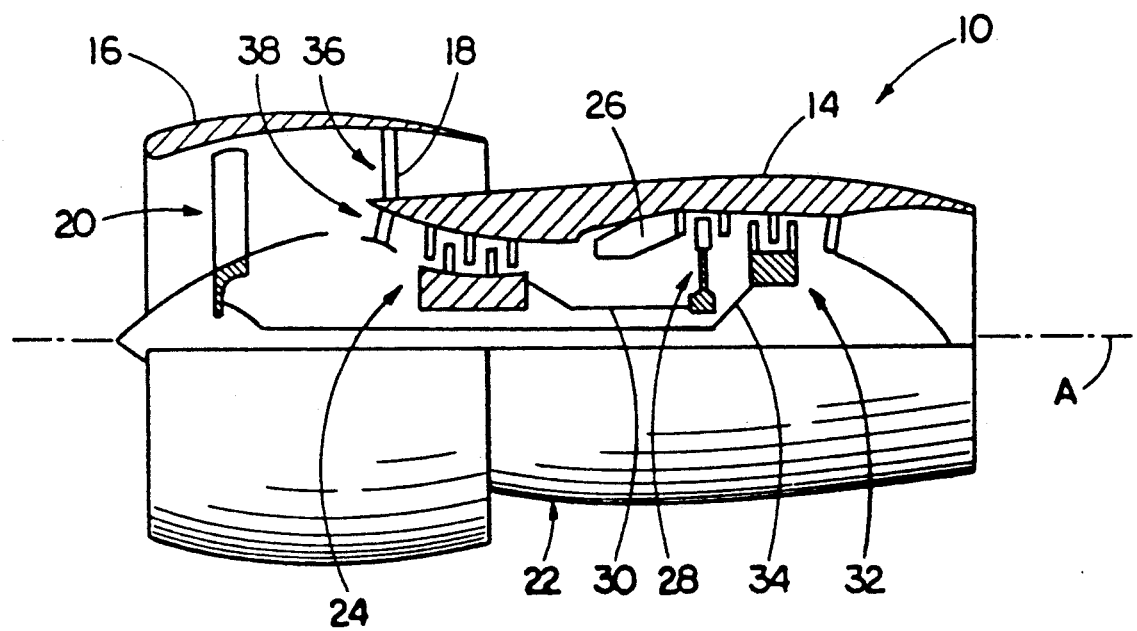
FIG. 1 is a schematic representation of a prior art gas turbine engine which can incorporate a structural frame component using a multi-yoke attachment of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Engine

Referring now to the drawings, and particularly to FIG. 1, there is schematically illustrated a prior art gas turbine engine, generally designated 10, to which is applied a structural frame component 12 (FIGS. 2 and 3) that can be modified to incorporate the present invention. The engine 10 has a longitudinal center line or axis A and an outer stationary annular casing 14 and nacelle 16 disposed coaxially and concentrically about the axis A. The nacelle 16 is supported about the forward end of the casing 14 by a plurality of struts 18, only one of which being shown in FIG. 1.

The engine 10 includes a forward fan 20 disposed within the nacelle 16 and a core gas generator engine 22 disposed rearwardly of the fan 20 and within the stationary casing 14. The core engine 22 is composed of a multi-stage compressor 24, a combustor 26, and a high pressure turbine 28, either single or multiple stage, all arranged coaxially about the longitudinal axis A of the engine 10 in a serial, axial flow relationship. An annular outer drive shaft 30 fixedly interconnects the compressor 24 and high pressure turbine 28. The engine 10 further includes a low pressure turbine 32 disposed rearwardly of the high pressure turbine 28. The low pressure turbine 32 is fixedly attached to an inner drive shaft 34 which, in turn, is connected to the forward fan 20. Conventional bearings and the like have been omitted from FIG. 1 in the sake of clarity.

In operation, air enters the gas turbine engine 10 through an air inlet of the nacelle 16 surrounding the forward fan 20. The air is compressed by rotation of the fan 20 and thereafter is split between an outer annular passageway 36 defined between the nacelle 16 and the engine casing 14, and a core engine passageway 38 having its external boundary defined by the engine casing 14. The pressurized air entering the core engine passageway 38 is further pressurized by the compressor 24. Pressurized air from the compressor 24 is mixed with fuel in the combustor 26 and ignited, thereby generating combustion gases. Some work is extracted from these gases by the high pressure turbine 28 which drives the compressor 24. The remainder of the combustion gases are discharged from the core engine 22 into the low pressure power turbine 32 to drive the forward fan 20. The portion of the air flow provided from the fan 20 through the outer passageway 36 produces the main propulsive thrust generated by the engine 10.

Figure 2:
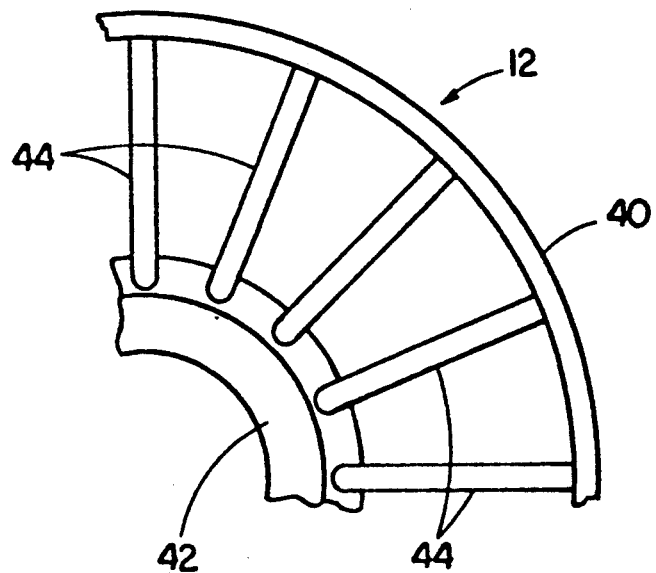
FIG. 2 is a fragmentary schematic representation of a structural frame component of an turbine engine.
Figure 3:
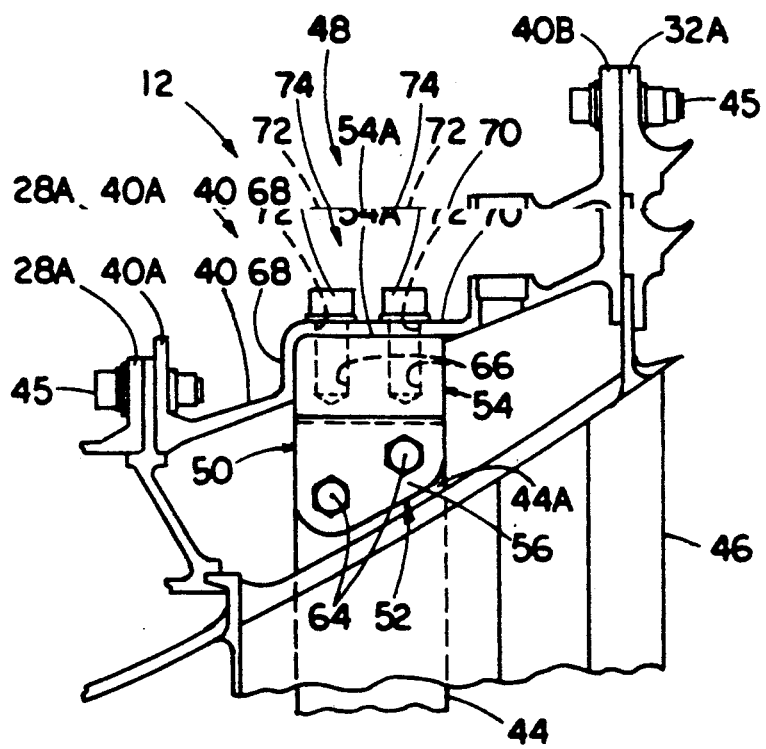
FIG. 3 is a fragmentary enlarged side elevational view of a structural frame component and one clevis of the multi-yoke attachment of the present invention.

Referring now to FIGS. 2 and 3, there is illustrated an exemplary prior art annular structural frame component 12 which is incorporated by the engine 10. For instance, the frame component 12 can be located between the high pressure turbine 28 and the low pressure turbine 32 of the engine 10 shown in FIG. 1. The structural frame component 12 basically includes an annular outer shell 40, an annular inner central hub 42, and a plurality of radial struts 44 circumferentially-spaced from one another and extending between and connected to the outer shell 40 and inner central hub 42. As seen in FIG. 3, the outer shell 40 has flanges 40A, 40B at its forward and aft ends which are rigidly attached by bolts 45 to respective aft and forward casing flanges 28A, 32A of the high and low pressure turbines 28, 32.

To protect the radial frame struts 44 from the high temperature gases in the flowpath, from the high pressure turbine 28 to the low pressure turbine 32, an aerodynamically-shaped fairing or nozzle 46 encases each of the frame struts 44, as seen in FIG. 3. The nozzles 46 are assembled about the frame struts 44 by placing them over the outer ends 44A of the struts 44. This must be carried out before the struts 44 are attached to the outer casing or shell 40. Thus, a mechanical connection of some type must be provided between the outer ends 44A of the struts 44 and the outer shell 40 which can be readily assembled after the nozzles 46 have first been installed over the struts 44.

Multi-Yoke Strut Attachment of the Invention

Figure 4:
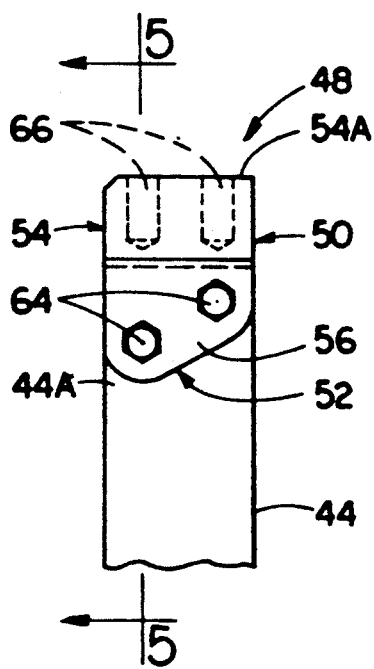
FIG. 4 is a fragmentary side elevational view of an upper end portion of the strut and the one clevis by itself.
Figure 5:
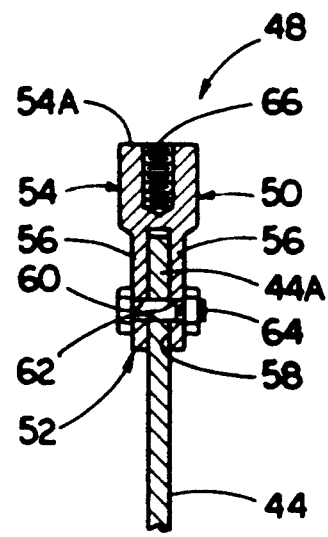
FIG. 5 is a longitudinal sectional view of the upper end portion of the strut and the one clevis taken along line 5—5 of FIG. 4.

Referring now to FIGS. 3-5, there is illustrated a multi-yoke attachment, generally designated 48, that includes a plurality of yokes 48 (only one being illustrated). Each yoke 48 includes a clevis 50 attached between the outer shell 40 and an outer end 44A of a respective one strut 44.

Basically, each clevis 50 has a one-piece construction and includes an inner bifurcated portion 52 and an outer base portion 54 integrally connected to the inner portion 52. The inner bifurcated portion 52 of each clevis 50 is formed by a pair of generally parallel spaced tabs 56 which define a slot 58 between them. The slot 58 snugly receives the outer end 44A of the respective strut 44. The outer base portion 54 of the clevis 50 overlies the outer end 44A of the respective strut 44 received in the slot 58 defined by the inner bifurcated portion 52 of the clevis 50. Pairs of holes 60 are formed through the connecting tabs 56 of the inner bifurcated portion 52 which are aligned with one another and with holes 62 defined through the outer end 44A of the strut 44.

Each yoke 48 also includes a plurality of fasteners 64 fitted through the aligned holes 60, 62 to releasably fasten the clevis 50 at its inner bifurcated portion 52 to the outer end 44A of the strut 44. The fasteners 64 can take any suitable form, such as expandable shear bolts or interference fitting shear pins.

The outer base portion 54 of each clevis 50 has at least one and preferably a pair of threaded bores 66 formed therein. The bores 66 open at an outer end 54A of the outer base portion 54 and extend radially inwardly into the base portion 54 toward the inner bifurcated portion 52 of the clevis 50, stopping short of reaching the slot 58, as can be seen in FIG. 5. Localized pockets 68 (FIG. 3) can be formed in the outer shell 40 to provide a bolt pad or land 70 having a pair of openings 72 therethrough which align with the pair of bores 66 in the outer base portion 54 of the clevis 50. Each yoke 48 further includes at least one and preferably a pair of fasteners 74, such as high strength bolts, which are threaded into the radial bores 66 to securely, but releasably, attach the outer base portion 54 of the clevis 50 to the land 70 on the outer shell 40.

By way of example, the yoke or clevis 50 can be a forged and machined part or a machined casting. The holes 60, 62 for receiving the fastening bolts 64 can be line drilled into the clevis tabs 56 and outer end 44A of the strut 44 to minimize hole tolerances between the mating parts and to provide the tightest possible fit for the expandable bolts. The outer base portion 54 of the clevis 50 can also be machined to provide the optimum mating with the bolt pad 70 on the outer shell 40.

Advantageously, the yokes 48 of the multi-yoke attachment permit easy attaching of the frame struts 44 to the outer shell 40 with the radial bolts 74 and the use of thinner, more aerodynamically desirable frame struts than would otherwise be possible. Also, the attachment 48 provides not only a tight fit needed for frame stiffness, but also offers easy nozzle removal, as well.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A structural frame component for use in a gas turbine engine, said component comprising:
    (a) an annular outer shell;
    (b) an annular inner central hub;
    (c) a plurality of circumferentially-spaced struts extending between the outer shell and central hub, each strut being attached at its inner end to said central hub; and
    (d) a multi-yoke attachment including a plurality of yokes, each yoke including a clevis releasably attached between said outer shell and an outer end of a respective one of said struts, said clevis having a one-piece construction and including
        (i) an inner bifurcated portion attached to opposite sides of said outer end of said one strut, and
        (ii) an outer base portion integrally connected to said inner bifurcated portion and attached to said outer shell, said outer base portion being disposed in an outer overlying relation to said outer end of said respective one strut outwardly from and attached to said inner bifurcated portion.

2. The frame component as recited in claim 1, wherein:
    said inner bifurcated portion of each clevis includes a pair of generally parallel spaced apart tabs defining a slot therebetween, said slot being capable of receiving said outer end of said respective one strut; and
    said each yoke also includes means for releasably fastening said outer end of said respective one strut to said tabs.

3. The frame component as recited in claim 2, wherein said fastening means includes:
    means defining holes through said outer end of said respective one strut;
    means defining holes through said tabs of said inner bifurcated portion which are aligned with one another and with said holes defined through said strut outer end; and
    a plurality of fasteners fitted through said aligned holes to releasably fasten said clevis at said inner bifurcated portion thereof to said outer end of said respective one strut.

4. The frame component as recited in claim 2, wherein said outer base portion of said each clevis has at least one threaded bore formed therein, said bore being open at an outer end of said outer base portion and extend radially inwardly into said base portion toward said inner bifurcated portion of said clevis and in alignment with said slot defined between said spaced apart tabs of said inner bifurcated portion of said clevis.

5. The frame component as recited in claim 4, wherein said each yoke further includes at least one threaded fastener being threadable into said radial bore to releasably attach said outer base portion of said clevis to said outer shell.

6. In a gas turbine engine including a high pressure turbine and a low pressure turbine having respective outer casings, a structural frame component, comprising:
    (a) an annular outer shell attached to, and extending between, said casings of said high and lower pressure turbines;
    (b) an annular inner central hub concentric with said outer shell about a common axis;
    (c) a plurality of circumferentially-spaced struts extending between the outer shell and central hub, each strut being attached at its inner end to said central hub; and
    (d) a multi-yoke attachment including a plurality of yokes, each yoke including a clevis releasably attached between said outer shell and an outer end of a respective one of said struts, said clevis having a one-piece construction and including
        (i) an inner bifurcated portion attached to opposite sides of said outer end of said strut, and
        (ii) an outer base portion integrally connected to said inner bifurcated portion and attached to said outer shell, said outer base portion being disposed in an outer overlying relation to said outer end of said respective one strut outwardly from and attached to said inner bifurcated portion.

7. The frame component as recited in claim 6, wherein:
    said inner bifurcated portion of each clevis includes a pair of generally parallel spaced apart tabs defining a slot therebetween, said slot being capable of receiving said outer end of said respective one strut; and
    said each yoke also includes means for releasably fastening said outer end of said respective one strut to said tabs.

8. The frame component as recited in claim 7, wherein said fastening means includes:
    means defining holes through said outer end of said respective one strut;
    means defining holes through said tabs of said inner bifurcated portion which are aligned with one another and with said holes defined through said strut outer end; and
    a plurality of fasteners fitted through said aligned holes to releasably fasten said clevis at said inner bifurcated portion thereof to said outer end of said respective one strut.

9. The frame component as recited in claim 7, wherein said outer base portion of said each clevis has at least one threaded bore formed therein, said bore being open at an outer end of said outer base portion and extend radially inwardly into said base portion toward said inner bifurcated portion of said clevis and in alignment with said slot defined between said spaced apart tabs of said inner bifurcated portion of said clevis.

10. The frame component as recited in claim 9, wherein said each yoke further includes at least one threaded fastener being threadable into said radial bore to releasably attach said outer base portion of said clevis to said outer shell.

* * * * *